United States Patent
Sakano et al.

(10) Patent No.: US 12,511,775 B2
(45) Date of Patent: Dec. 30, 2025

(54) SELF-MAP GENERATION DEVICE AND SELF-POSITION ESTIMATION DEVICE

(71) Applicant: Hitachi Astemo, Ltd., Hitachinaka (JP)

(72) Inventors: Morihiko Sakano, Tokyo (JP); Hideyuki Kume, Tokyo (JP); Hidehiro Toyoda, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 224 days.

(21) Appl. No.: 18/258,884

(22) PCT Filed: Aug. 31, 2021

(86) PCT No.: PCT/JP2021/031928
§ 371 (c)(1),
(2) Date: Jun. 22, 2023

(87) PCT Pub. No.: WO2022/153586
PCT Pub. Date: Jul. 21, 2022

(65) Prior Publication Data
US 2024/0046502 A1   Feb. 8, 2024

(30) Foreign Application Priority Data
Jan. 13, 2021  (JP) ................. 2021-003177

(51) Int. Cl.
G09B 29/00 (2006.01)
G01C 21/28 (2006.01)
G06T 7/70 (2017.01)

(52) U.S. Cl.
CPC ............... *G06T 7/70* (2017.01); *G01C 21/28* (2013.01)

(58) Field of Classification Search
CPC ..... G09G 5/38; G01C 21/3811; G01C 21/367
(Continued)

(56) References Cited

U.S. PATENT DOCUMENTS

2015/0057871 A1* 2/2015 Ono ................. G01C 21/3848
                                                               701/23
2018/0347990 A1 12/2018 Mishina et al.
(Continued)

FOREIGN PATENT DOCUMENTS

JP   2001-169310 A    6/2001
JP   2006-338384 A   12/2006
(Continued)

OTHER PUBLICATIONS

Gim et al., Landmark Attribute Analysis for a High-Precision Landmark-Based Local Positioning System, Digital Object Identifier 10.1109/ACCESS.2021.3053214, pp. 18061-18071 (Year: 2021).*
(Continued)

*Primary Examiner* — Samantha (Yuehan) Wang
(74) *Attorney, Agent, or Firm* — Foley & Lardner LLP

(57) ABSTRACT

Provided are a self-map generation device and a self-position estimation device with which it is possible to achieve high-accuracy self-position estimation even when an observation error due to a sensor is large by estimating an error amount of a landmark serving as an observation point and improving the quality of a self-generated point group map. This self-map generation device generates a point group map from point group data of external information obtained by a vehicle-mounted sensor mounted in a vehicle, and comprises: a landmark detection unit that detects a landmark from the point group map; a landmark information accumulation unit that accumulates observation position information of the detected landmark; a landmark position correction unit that corrects the position of the landmark on the basis of point group coordinates extracted from an error distribution detected when the observation position information of the landmark has been frequency-distributed; and a self-map generation unit that saves, as a self-generated map, a corrected map obtained by correcting the position of
(Continued)

the landmark and obtained from the landmark position correction unit.

6 Claims, 12 Drawing Sheets

(58) Field of Classification Search
USPC .......................................................... 345/634
See application file for complete search history.

(56) References Cited

U.S. PATENT DOCUMENTS

2020/0302662 A1\* 9/2020 Homayounfar ...... G06V 10/454
2020/0341470 A1 10/2020 Maeda et al.

FOREIGN PATENT DOCUMENTS

| JP | 2011-210121 A | 10/2011 |
| JP | 2012-208525 A | 10/2012 |
| JP | 2015-186009 A | 10/2015 |
| JP | 2019-086406 A | 6/2019 |
| JP | 2019-178971 A | 10/2019 |
| WO | WO-2017/022019 A1 | 2/2017 |
| WO | WO-2019/176083 A1 | 9/2019 |

OTHER PUBLICATIONS

International Search Report with English Translation and Written Opinion of International Patent Application No. PCT/JP2021/031928 dated Nov. 2, 2021 (11 pages).

\* cited by examiner

SELF-MAP GENERATION DEVICE AND SELF-POSITION ESTIMATION DEVICE

TECHNICAL FIELD

The present invention relates to a self-map generation device and a self-position estimation device.

BACKGROUND ART

In order to expand the application range of an automatic driving/driving support system, it is important to acquire information from a map based on self-position estimation. However, for example, for an expressway, a map for the driving support system is prepared, but the preparation of a map for a residential area such as a general road or a neighborhood of a house has not been made. Therefore, there is a demand for a technique capable of self-generating a map and estimating a self-position.

On the other hand, PTL 1 describes that "map information including an arrangement position of a fixed object in a predetermined area is stored, and when the map is recreated, (1) to (5) are repeatedly executed while moving the robot 10 in the predetermined area. (1) Integrating the encoder 21 to calculate the self-position of the robot, (2) measuring a distance to the fixed object and the movable object within a predetermined viewing angle range of the robot, (3) obtaining the corrected self-position from the measured distance and a distance to the fixed object obtained from the map information, (4) extracting a measurement value representing the distance to the movable object from among the measurement values, and (5) calculating the arrangement position of the movable object from the extracted measurement value and the corrected self-position. Then, a new arrangement position is obtained by aggregating the calculated arrangement positions of the movable object, and the obtained new arrangement position is output to the outside."

CITATION LIST

Patent Literature

PTL 1: JP 2011-210121 A

SUMMARY OF INVENTION

Technical Problem

In the conventional technique described in PTL 1, by moving while automatically correcting the self-position and further automatically recreating the map, it is possible to reduce the cost required for recreating the environmental map (point group map) and to recreate the environmental map in a timely manner. However, since the observation error information of a landmark is not considered, there is a problem that the accuracy of self-position estimation becomes insufficient when the observation error of the landmark is large. When self-generating a map, self-position estimation is performed by using landmarks registered on the map. Therefore, it is necessary to register landmarks used for self-position estimation on the map with high accuracy required for the automatic driving/driving support system.

The present invention has been made in view of the above circumstances, and an object of the present invention is to provide a self-map generation device and a self-position estimation device with which it is possible to achieve high-accuracy self-position estimation even when an observation error due to a sensor is large by estimating an error amount of a landmark serving as an observation point and improving the quality of a self-generated point group map.

Solution to Problem

One of representative self-map generation devices of the present invention is a self-map generation device which generates a point group map from point group data of external information obtained by a vehicle-mounted sensor mounted on a vehicle, the self-map generation device comprising: a landmark detection unit that detects a landmark from the point group map; a landmark information accumulation unit that accumulates observation position information of the detected landmark; a landmark position correction unit that corrects a position of the landmark on a basis of point group coordinates extracted from an error distribution detected when observation position information of the landmark is frequency-distributed; and a self-map generation unit that saves, as a self-generated map, a corrected map obtained by correcting the position of the landmark and obtained from the landmark position correction unit.

Advantageous Effects of Invention

According to the present invention, it is possible to perform high-accuracy self-position estimation even when an observation error due to a sensor is large by estimating an error amount of a landmark serving as an observation point and improving the quality of a self-generated point group map.

Problems, configurations, and effects other than those described above will be clarified by the following description of embodiments.

DESCRIPTION OF EMBODIMENTS

Figure 1:
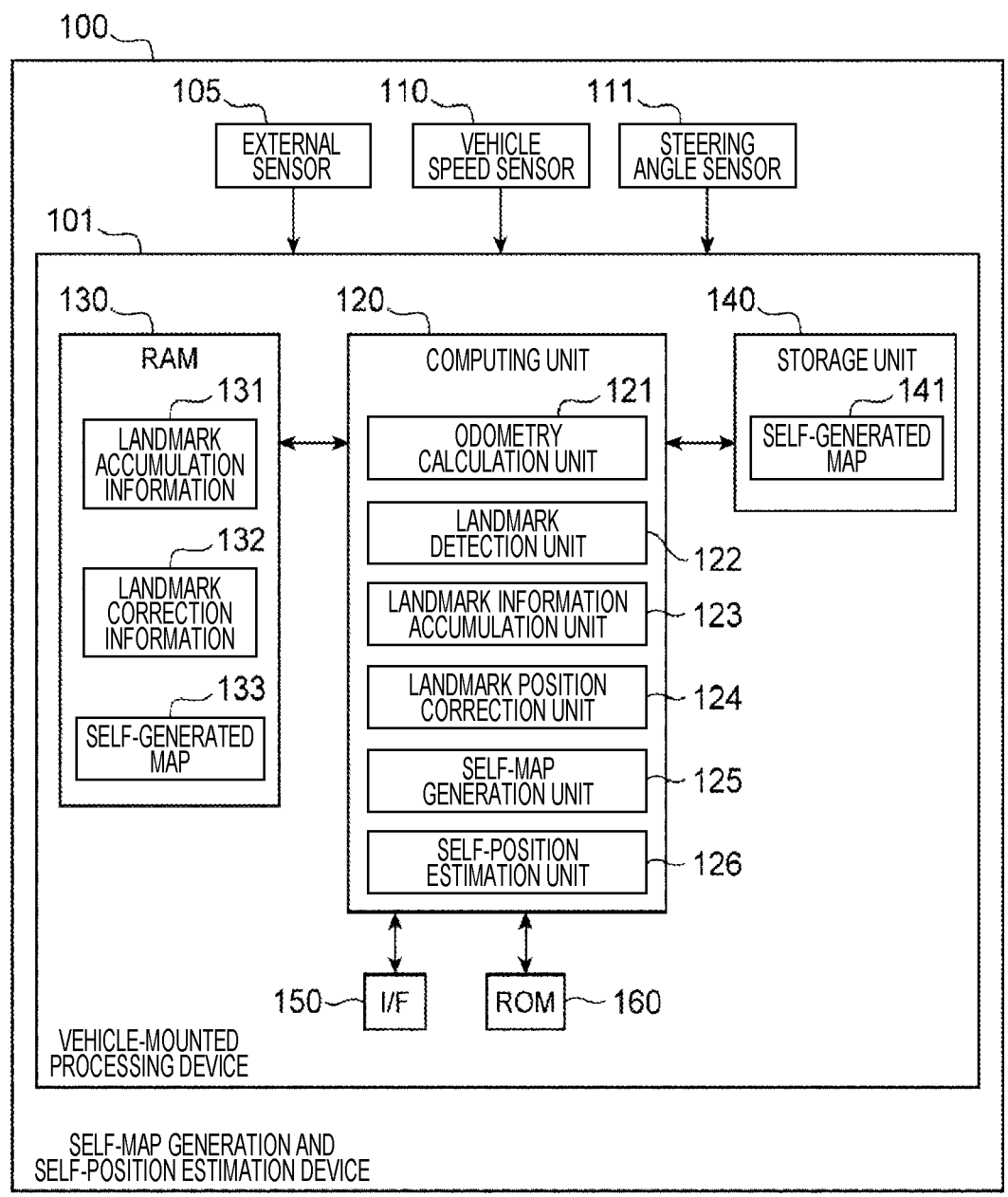
FIG. 1 is a block diagram illustrating a configuration of a self-map generation and self-position estimation device 100 according to a first embodiment of the present invention.

Hereinafter, embodiments of a self-map generation device and a self-position estimation device according to the present invention will be described with reference to FIGS. 1 to 11. Incidentally, in all the drawings for describing the embodiments of the present invention, parts having the same functions are denoted by the same reference numerals, and repetitive description thereof may be omitted.

First Embodiment

FIG. 1 is a block diagram illustrating a configuration of a self-map generation and self-position estimation device 100 according to a first embodiment of the present invention. The self-map generation and self-position estimation device 100 is a device that is mounted on a vehicle, generates a point group map (self-generated point group map) from point group data of external information obtained by a vehicle-mounted sensor, and estimates a self-position (own vehicle position) on the point group map. The self-map generation and self-position estimation device 100 includes a sensor group (105, 110, 111) and a vehicle-mounted processing device 101. The sensor group which is a vehicle-mounted sensor is connected to the vehicle-mounted processing device 101 by a signal line, and transmits and receives various kinds of data to and from the vehicle-mounted processing device 101.

The vehicle-mounted processing device 101 includes a computing unit 120, a RAM 130, a storage unit 140, an interface 150, and a ROM 160. The computing unit 120 is a CPU. All or part of the computing processing may be executed by another computing processing device such as an FPGA. The RAM 130 is a readable/writable storage area, and operates as a main storage device of the vehicle-mounted processing device 101. The RAM 130 stores landmark accumulation information 131, landmark correction information 132, and a self-generated map 133 to be described later. The ROM 160 is a read-only storage area and stores a program to be described later. This program is developed in the RAM 130 and executed by the computing unit 120. The computing unit 120 reads and executes the program to operate as an odometry calculation unit 121, a landmark detection unit 122, a landmark information accumulation unit 123, a landmark position correction unit 124, a self-map generation unit 125, and a self-position estimation unit 126. The storage unit 140 is a nonvolatile storage device, and operates as an auxiliary storage device of the vehicle-mounted processing device 101. The self-generated map 141 is stored in the storage unit 140. As will be described later, the self-generated map 141 stored in the storage unit 140 may refer to a map different from the self-generated map 133 stored in the RAM 130.

The sensor group includes an external sensor 105 that observes surroundings (external information) of the vehicle, a vehicle speed sensor 110, and a steering angle sensor 111.

The external sensor 105 indicates a sensor from which a distance to a surrounding object can be observed (in other words, a sensor which can function as a distance sensor), for example, a stereo camera. The stereo camera may be one unit in which two cameras are arranged side by side and separated by a constant base length, may be one that can be utilized as a stereo camera by calibration in a state where two cameras are roughly attached, may be one in which two cameras are arranged vertically, or may be one in which three or more cameras are utilized. In addition, the external sensor 105 may utilize a motion stereo method with a monocular camera, or may be a sensor such as LiDAR, a millimeter wave radar, or sonar. In the present embodiment, a stereo camera in which two cameras are arranged side by side and separated by a constant base length into one unit is assumed and described. The external sensor 105 outputs an image obtained by photographing and parallax necessary for distance calculation to the vehicle-mounted processing device 101. Herein, the external sensor 105 may output only a captured image to the vehicle-mounted processing device 101, and the parallax may be calculated by the computing unit 120.

The vehicle-mounted processing device 101 measures a landmark to be described later by using the captured image obtained from the external sensor 105 and the parallax. External parameters, which are the attachment position and the attachment posture of the external sensor 105, are known and saved in advance in the ROM 160. Alternatively, in the vehicle-mounted processing device 101, the computing unit 120 may perform estimation by using the captured image, the parallax, the vehicle speed sensor 110, and the steering angle sensor 111. In addition, external parameters indicating a relative relationship between the two cameras of the stereo camera and internal parameters such as the focal length of the camera and the size of the imaging element are known and saved in advance in the ROM 160. The vehicle-mounted processing device 101 can calculate the positional relationship between the external sensor 105 and a subject by using the internal parameters, the external parameters, and the parallax stored in the ROM 160.

The vehicle speed sensor 110 and the steering angle sensor 111 measure the vehicle speed and the steering angle of the vehicle on which the vehicle-mounted processing device 101 is mounted, and output the vehicle speed and the steering angle to the vehicle-mounted processing device 101. By using the outputs of the vehicle speed sensor 110 and the steering angle sensor 111, with a known dead reckoning technique, the vehicle-mounted processing device 101 calculates the movement amount and the movement direction of the vehicle on which the vehicle-mounted processing device 101 is mounted.

(Functional Block Configuration)

Figure 2:
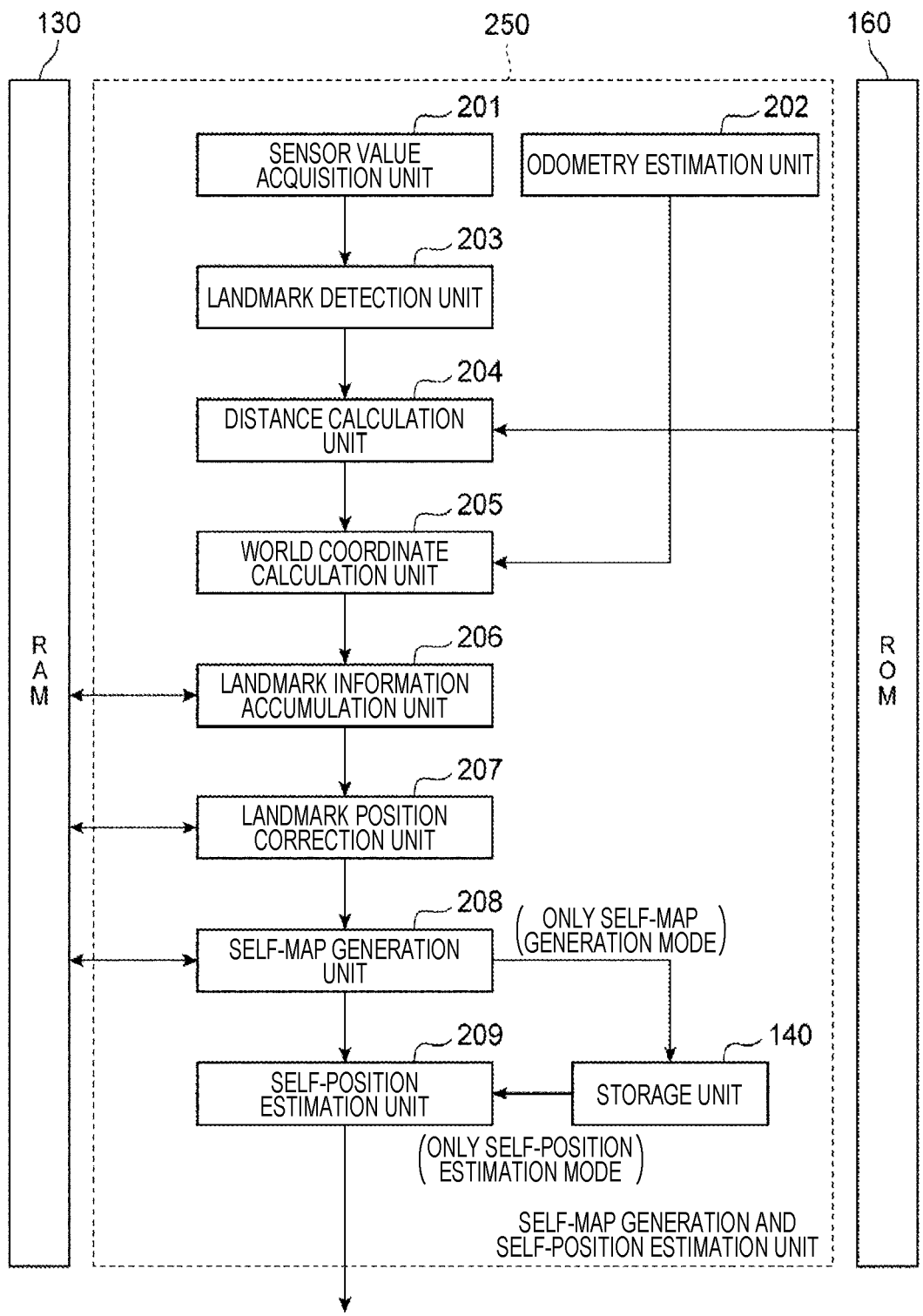
FIG. 2 is a functional block diagram illustrating an operation of the self-map generation and self-position estimation device 100 according to the first embodiment of the present invention.

FIG. 2 is a diagram illustrating, as functional blocks, the functions of the odometry calculation unit 121, the landmark detection unit 122, the landmark information accumulation unit 123, the landmark position correction unit 124, the self-map generation unit 125, and the self-position estimation unit 126 executed by the computing unit 120, and illustrating a processing order of the functional blocks, a data flow between the functional blocks, and a data flow between the functional blocks and the RAM 130, the ROM 160, and the storage unit 140. The self-map generation and self-position estimation unit 250 as a functional block responsible for self-map generation/self-position estimation of the vehicle-mounted processing device 101 includes a sensor value acquisition unit 201, an odometry estimation unit 202, a landmark detection unit 203, a distance calculation unit 204, a world coordinate calculation unit 205, a landmark information accumulation unit 206, a landmark position correction unit 207, a self-map generation unit 208, a self-position estimation unit 209, and the storage unit 140.

A functional block corresponding to the odometry calculation unit 121 in the computing unit 120 is the odometry estimation unit 202, a functional block corresponding to the landmark detection unit 122 in the computing unit 120 is the landmark detection unit 203, a functional block corresponding to the landmark information accumulation unit 123 in the computing unit 120 is the landmark information accumulation unit 206, a functional block corresponding to the landmark position correction unit 124 in the computing unit 120 is the landmark position correction unit 207, a functional block corresponding to the self-map generation unit 125 in the computing unit 120 is the self-map generation unit 208, and a functional block corresponding to the self-position estimation unit 126 in the computing unit 120 is the self-position estimation unit 209.

(Sensor Value Acquisition Unit 201)

The sensor value acquisition unit 201 acquires a signal output from the external sensor 105. In the case of a stereo camera, the signal is an image and parallax. The stereo camera performs photographing continuously at a high frequency, for example, 30 times per second. An image and parallax obtained by photographing by the stereo camera are transmitted to the vehicle-mounted processing device 101 every time the photographing is performed. The sensor value acquisition unit 201 receives the image and parallax at a constant frequency, and outputs the received image and parallax to the landmark detection unit 203. The subsequent processing units 203 to 209 operate each time of reception.

(Odometry Estimation Unit 202)

The odometry estimation unit 202 estimates a vehicle motion by using the speed and the steering angle of the vehicle transmitted from the vehicle speed sensor 110 and the steering angle sensor 111. For example, a known dead reckoning technique may be used, estimation may be performed using a known visual odometry technique using a camera, or a known Kalman filter or the like may be used in combination. In a case where a GPS is provided as in an automatic driving system illustrated in FIG. 11 to be described later, the information may also be utilized.

(Landmark Detection Unit 203)

The landmark detection unit 203 detects a landmark by using the image and parallax obtained from the sensor value acquisition unit 201. The landmark is an object having a feature identifiable by a sensor, and is, for example, a lane mark which is a type of road marking paint, a stop line, a crosswalk, a regulation display, a building wall which is an obstacle that hinders traveling of a vehicle, or the like. In the present embodiment, a vehicle or a human which is a moving object is not included in a landmark. On the basis of the information (specifically, the point group map generated from the point group data of the external information obtained by the external sensor 105) input from the external sensor 105 via the sensor value acquisition unit 201, a landmark existing around the vehicle, that is, an object having a feature identifiable by the sensor is detected. The landmark information may be obtained in units of pixels or may be obtained by being grouped as an object. When the landmark is, for example, a lane mark or a pedestrian crossing by image recognition, the landmark may or may not be identified. The landmark information obtained herein is output to the distance calculation unit 204.

(Distance Calculation Unit 204)

The distance calculation unit 204 calculates the distance to the landmark on the basis of the landmark information obtained by the landmark detection unit 203. The distance is detected for each pixel where the landmark exists or for the grouped objects. In the case of a stereo camera, a distance can be measured by the principle of triangulation from a parallax value, an internal parameter stored in the ROM 160, and an external parameter between cameras. Furthermore, three-dimensional coordinates of the object shown in the corresponding pixel can be measured from the distance information. Using this, corresponding three-dimensional coordinates (observation position information) are measured for the pixel where the landmark exists or the grouped objects. However, the parallax is calculated by processing such as block matching, and always includes an error. This error causes an error in the distance, and the three-dimensional coordinates of the object include an observation error. This observation error of the three-dimensional coordinates has a property of occurring in a linear direction connecting the origin and the object in all cameras including a stereo camera. In a case where another external sensor (distance sensor) is used, a similar error may occur. In a case where a self-map (self-generated map) is generated by the self-map generation unit 208 to be described later in a state where the error is large and self-position estimation is performed by the self-position estimation unit 209 to be described later, the accuracy of self-position estimation is reduced due to the influence of the error. Therefore, it is desirable to reduce this error in some way. In addition, the three-dimensional coordinates are observation values in the sensor coordinate system, and are relative coordinate values from the sensor. The relative coordinate values obtained herein are output to the world coordinate calculation unit 205.

(World Coordinate Calculation Unit 205)

The world coordinate calculation unit 205 can transform the distance information (observation position information) of the landmark, which is the relative coordinate value from the sensor obtained by the distance calculation unit 204, into the world coordinate value by using the motion information of the own vehicle obtained from the odometry estimation unit 202 and the external parameters indicating the attachment position and the attachment posture of the camera stored in the ROM 160. In a case where the GPS is not provided and estimation is performed by dead reckoning or visual odometry, this world coordinate value is a world coordinate value based on a certain coordinate and a certain axis. For example, it is sufficient if a position at which the vehicle-mounted processing device 101 is started is taken as an origin, a direction immediately preceding the origin is be taken as an X axis, and an axis orthogonal to the X axis is taken as a Y axis or a Z axis. In a case where a GPS is provided as in the automatic driving system illustrated in FIG. 11 to be described later, absolute world coordinate values such as latitude and longitude can be obtained. The world coordinate value of each landmark obtained herein is output to the landmark information accumulation unit 206.

(Landmark Information Accumulation Unit 206)

The landmark information accumulation unit 206 accumulates measurement (observation) position information of each landmark obtained by the world coordinate calculation unit 205 in time series. This information is utilized by the landmark position correction unit 207 to be described later to reduce a position measurement error of each landmark. In the landmark information accumulation unit 206, for example, the vote for measurement position information (world coordinate value) of each landmark obtained by the world coordinate calculation unit 205 is cast in time series on a map, which is called a grid map, obtained by dividing a space into voxels. The vote mentioned here is processing of incrementing the value of the voxel by one when one observation value included in the corresponding voxel is obtained. When this is repeated every time the sensor value (signal) is received by the sensor value acquisition unit 201 (that is, when the frequency distribution is performed), a difference (of the frequency distribution) occurs between a place where the number of observations is large and a place where the number of observations is small. Then, in the case of a stereo camera, the observation value has a measurement distance error derived from a parallax error, the measurement distance error is reflected in the voting value of the grid map, and an error distribution (that is, the error distribution detected when the measurement position information has been frequency-distributed) for each observation object appears on the grid map. This will be described later with reference to FIGS. 3A and 3B. In this processing, the landmark information is accumulated in time series in the form of voting on the grid map. The grid map may be two-dimensional or three-dimensional. In order to accumulate the information in time series, the information accumulated in the RAM 130 is stored as the landmark accumulation information 131 (FIG. 1) when voting of the world coordinate values, which are obtained by the sensor value acquisition unit 201 at a certain time, for all the landmarks is completed. At the next time, when the sensor value acquisition unit 201 receives the sensor value (signal), the landmark accumulation information 131, which is the accumulated landmark information, is read from the RAM 130, and the observation value (world coordinate value) at the current time is accumulated in the read information. A processing flow of the landmark information accumulation unit 206 will be described later with reference to FIG. 4. Subsequently, the processing proceeds to the landmark position correction unit 207.

(Landmark Position Correction Unit 207)

The landmark position correction unit 207 uses the landmark accumulation information 131 (FIG. 1) stored in the RAM 130 to correct a position error in landmark detection. As described above, when the landmark information is accumulated in the landmark information accumulation unit 206, the error distribution (that is, the error distribution detected when the measurement position information has been frequency-distributed) for each observation object can be visualized. In addition, this error distribution has a tendency that an error spreads in a linear direction (a line-of-sight direction or a ray direction) connecting the sensor and the observation object from the characteristics of the sensor (due to a parallax error of the distance sensor). In this regard, with respect to the landmark accumulation information 131 (FIG. 1), scanning is performed in a linear direction (a line-of-sight direction or a ray direction) connecting the sensor and the observation object, and a peak position of the error distribution is detected as landmark point group coordinates, thereby estimating a true observation position of the object. This will be supplementarily described later with reference to FIGS. 3A and 3B. The estimated observation position (=peak position) is set as a landmark correction position. At the same time, for the observation object, the observation reliability (also referred to as importance) is lower as the magnitude of the error distribution is larger. Therefore, the landmark position correction unit 207 acquires the spread (corresponding to the estimated error amount) of the error distribution and utilizes the spread as the reliability (importance) of the target observation object in the subsequent processing. The landmark correction position and the magnitude (estimated error amount) of the spread of the error distribution of the corresponding landmark are stored as landmark correction information 132 (FIG. 1) in the RAM 130. The processing flow of the landmark position correction unit 207 will be described later with reference to FIG. 5. Next, the processing proceeds to the self-map generation unit 208.

(Self-Map Generation Unit 208)

The self-map generation unit 208 generates a map (specifically, the corrected map in which the position of the landmark is corrected) by using the landmark accumulation information 131 and the landmark correction information 132 obtained by the landmark position correction unit 207. The map may be expressed as a point group corresponding to landmark points, or may be expressed in a form of a recognized object and the coordinates thereof. In a case where the map is output as the point group, in the self-map, on the basis of the peak position information obtained in the landmark correction information 132, the landmarks in a certain range around the peak position in the landmark accumulation information 131 are output as a landmark point group to the self-generated map.

The operation of the self-map generation unit 208 varies depending on the mode of the self-map generation and self-position estimation unit 250. There are two modes: a self-map generation mode and a self-position estimation mode. It is assumed that the two modes are determined in some form when the self-map generation and self-position estimation unit 250 is operated. For example, the mode information may be input from the interface 150 (FIG. 1) by some means.

(Self-Map Generation Mode)

The self-map generation mode is intended for self-map generation. In the self-map generation mode, the self-position estimation unit 209 in the subsequent stage is not performed. Upon receiving a map saving command, the self-map generation unit 208 stores (saves) the entire range obtained from the landmark accumulation information 131 as the self-generated map 141 in the storage unit 140 (FIG. 1). After the storage, the processing does not proceed to the self-position estimation unit 209 in the subsequent stage, and the processing ends.

(Self-Position Estimation Mode)

An object of the self-position estimation mode is to read the self-generated map 141 (FIG. 1) stored in the storage unit 140 in the past by the self-map generation mode and estimate the self-position on the self-generated map 141. The self-position estimation unit 209 at the subsequent stage collates the self-generated map previously saved in the storage unit 140 with the self-generated map (=corrected map) output from the current observation value in the self-position estimation mode (from the self-map generation unit 208). In the self-position estimation mode, the self-generated map (=corrected map) output (from the self-map generation unit 208) is a partial map of a range which is a predetermined distance back from the current own vehicle position. The use of the partial map has the effects of preventing a collation mistake, shortening a collation time, and reducing the influence of an odometry error. The partial map is stored (saved) as the self-generated map 133 (FIG. 1) in the RAM 130 and is output to the self-position estimation unit 209. Next, the processing proceeds to the self-position estimation unit 209. A processing flow of the self-map generation unit 208 will be described later with reference to FIG. 6.

(Self-Position Estimation Unit 209)

The self-position estimation unit 209 operates only in the case of the self-position estimation mode. The self-position estimation unit 209 collates the self-generated map (partial map, corrected map) 133 obtained from the self-map generation unit 208 with the self-generated map 141 generated in the past and stored in the storage unit 140 to estimate the self-position on the self-generated map 141. In the case of the point group, for example, an iterative closest point (ICP) algorithm which is a known point group matching technique can be used for the collation. As a result, the coordinate transformation amount for transforming the self-generated map (partial map, corrected map) 133 obtained from the self-map generation unit 208 onto the self-generated map 141 can be obtained, and the self-position on the self-generated map 141 can be obtained from the position of the current vehicle obtained by performing coordinate-transformation on the basis of the coordinate transformation amount. The estimated self-position is output, and the processing of the self-map generation and self-position estimation unit 250 ends. A processing flow of the self-position estimation unit 209 will be described later with reference to FIG. 7.

Figure 3A:
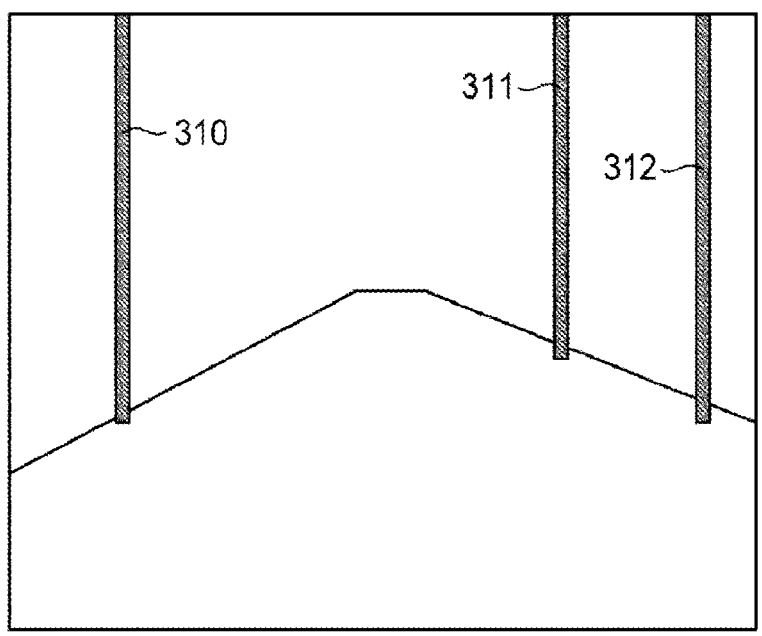
FIG. 3A is a diagram illustrating an outline of a method for detecting a peak position and estimating an observation error, and is a diagram illustrating a point currently observed.
Figure 3B:
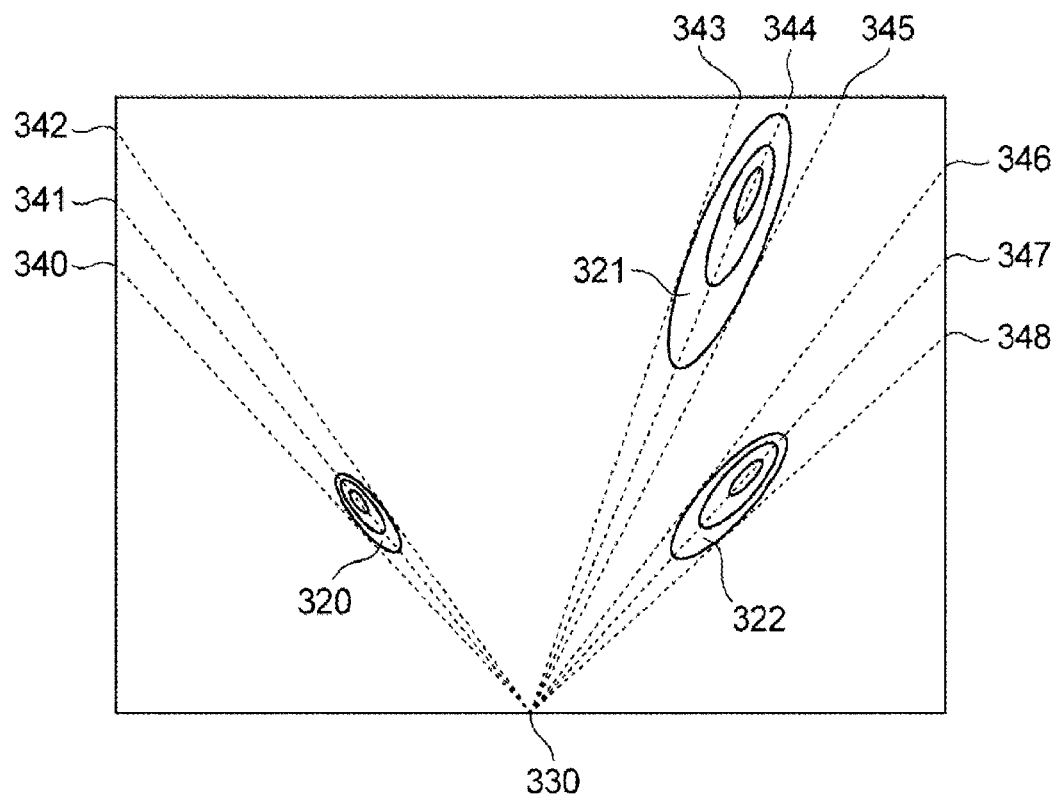
FIG. 3B is a diagram illustrating an outline of the method for detecting the peak position and estimating the observation error, and is a diagram illustrating an aspect of landmark accumulation information 131.

FIG. 3A is a diagram illustrating a point currently observed. In a case where the external sensor 105 is a camera, an image captured by the camera is similar to that in the drawing. At this point, there are utility poles 310, 311, and 312. FIG. 3B is a diagram illustrating an aspect of the landmark accumulation information 131 generated by the landmark information accumulation unit 206 at this point. In this example, in order to simplify understanding, the grid map shows a two-dimensional case obtained by compression in a height direction. Therefore, the grid map is a view as looking down from a bird's-eye view. Reference numerals 320, 321, and 322 in FIG. 3B represent contour lines of voting values of the landmark accumulation information 131, and correspond to respective observation results of the utility poles 310, 311, and 312. Reference numeral 330 in FIG. 3B represents a sensor position.

When the observation error is 0, originally on the two-dimensional grid map, the observation results of the utility poles 310, 311, and 312 appear only in the range corresponding to the diameter of the utility pole. However, in a case where there is an observation error, a characteristic of distribution in a linear direction (a line-of-sight direction or a ray direction) connecting the sensor position 330 and the utility poles 310, 311, and 312 is provided from an error characteristic of a sensor such as a stereo camera (due to a parallax error of the distance sensor), and contour lines of voting values of the landmark accumulation information 131 indicate error distributions such as 320, 321, and 322. The error caused by the sensor basically changes in the width and shape of the distribution with zero as the most frequent value according to the sensor, the object, the weather, and the sunshine condition with 0, and the error characteristic is reflected in the peak position and shape of each distribution as illustrated in FIG. 3B. The auxiliary lines 340, 341, and 342 are scanned on a straight line connecting the sensor position 330 and the observation result corresponding to the utility pole 310, the auxiliary lines 343, 344, and 345 are scanned on a straight line connecting the sensor position 330 and the observation result corresponding to the utility pole 311, the auxiliary lines 346, 347, and 348 are scanned on a straight line connecting the sensor position 330 and the observation result corresponding to the utility pole 312, and the peak position of the voting value of the landmark accumulation information 131 is detected, so that the true position of the landmark can be estimated even while the sensor, the object, the weather, and the sunshine conditions change. Each auxiliary line is merely a representative line for description, and may be scanned and detected with finer resolution.

A larger distribution means a larger error, that is, means that the observation value is unreliable (observation reliability is low). Therefore, the reliability (importance) of each landmark can be calculated by obtaining the magnitude of the distribution on each straight line. In this example, since the error (estimated error amount) of the distribution 321 with respect to the utility pole 311 is the largest, the distribution 321 is unreliable (observation reliability is low), and since the error (estimated error amount) of the distribution 311 with respect to the utility pole 310 is the smallest, the distribution 311 is reliable (observation reliability is high).

The peak detection can be realized by smoothing the voting value of the landmark accumulation information 131 on the scanning line and then using a known zero-cross method or the like. The magnitude of the distribution is obtained by obtaining a width from the peak position where the voting value of the landmark accumulation information 131 becomes equal to or larger than a predetermined value. In the present example, a case where the grid map is two-dimensional is described, but the same applies to a three-dimensional case.

(Operation of Landmark Information Accumulation Unit 206)

Figure 4:
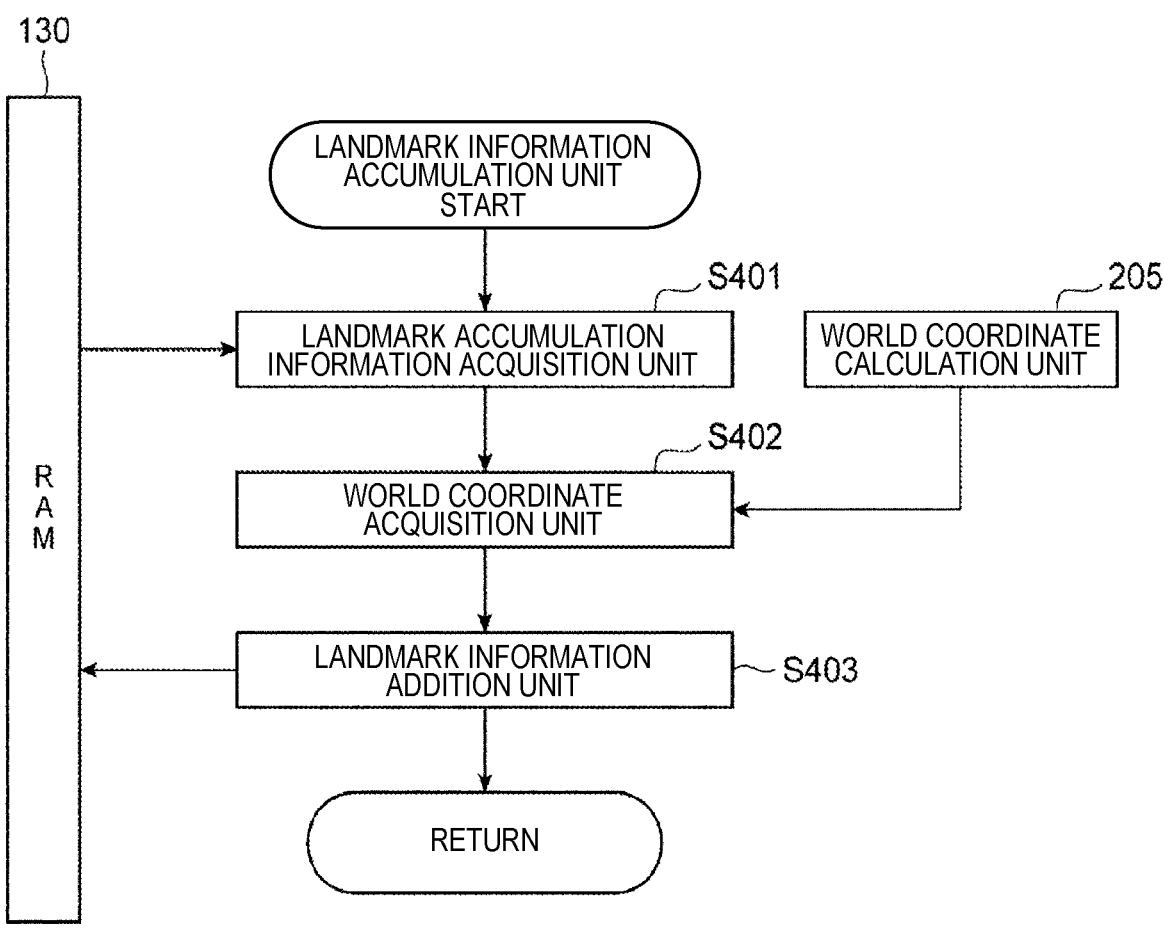
FIG. 4 is a flowchart illustrating an operation of a landmark information accumulation unit 206.

FIG. 4 is a flowchart illustrating an operation of the landmark information accumulation unit 206. The landmark information accumulation unit 206 performs the following operation each time an execution command is received from the world coordinate calculation unit 205. An execution subject of each step described below is the computing unit 120.

A landmark accumulation information acquisition unit in step S401 acquires the landmark accumulation information 131 stored in the RAM 130 and obtained up to the previous time. Next, the processing proceeds to step S402.

A world coordinate acquisition unit in step S402 acquires the world coordinate value of the landmark at the time calculated by the world coordinate calculation unit 205. Next, the processing proceeds to step S403.

A landmark information addition unit in step S403 updates the landmark accumulation information 131 by using the landmark accumulation information 131 obtained in step S401 and the world coordinate value of the landmark at the time obtained in step S402 and calculated by the world coordinate calculation unit 205. As described above with reference to FIGS. 3A and 3B, for example, the landmark accumulation information 131 is a space in which the votes for landmark points are cast in a space divided into a grid map or the like. In this space, the vote for the world coordinate value of the landmark at the time calculated by the world coordinate calculation unit 205 is additionally cast and updated. As a result, the landmark information observed at the time can be reflected in the landmark accumulation information 131. The updated landmark accumulation information 131 is stored in the RAM 130 for the purpose of being utilized by the landmark information accumulation unit 206 and the landmark position correction unit 207 after the next time, and replaces the old one, and the flowchart of FIG. 4 ends.

(Operation of Landmark Position Correction Unit 207)

Figure 5:
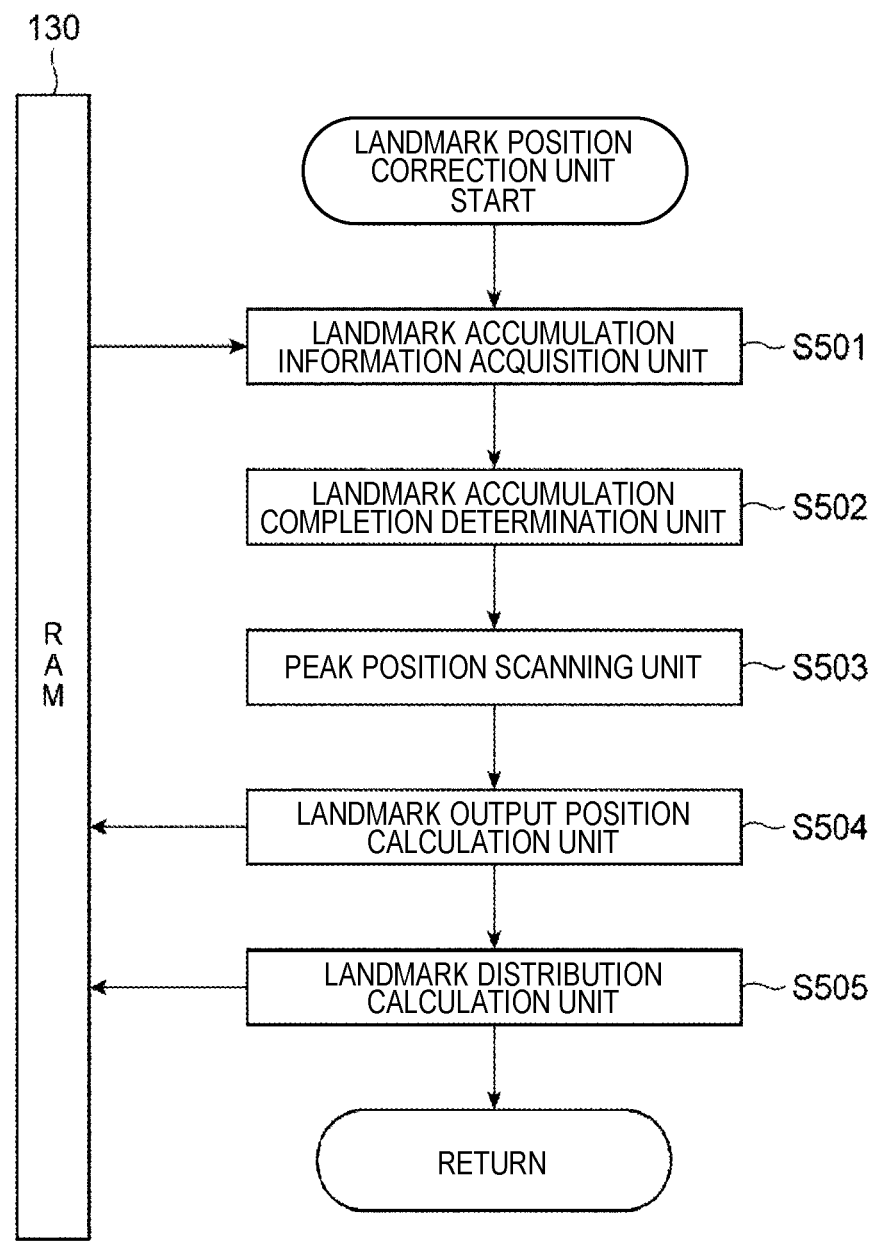
FIG. 5 is a flowchart illustrating an operation of a landmark position correction unit 207.

FIG. 5 is a flowchart illustrating an operation of the landmark position correction unit 207. The landmark position correction unit 207 performs the following operation each time an execution command is received from the landmark information accumulation unit 206. An execution subject of each step described below is the computing unit 120.

The landmark accumulation information acquisition unit in step S501 acquires the landmark accumulation information 131 calculated by the landmark information accumulation unit 206 and stored in the RAM 130. Next, the processing proceeds to step S502.

A landmark accumulation completion determination unit in step S502 determines a landmark grid for which accumulation has been completed. In the world coordinate value, it is determined that the accumulation of the landmark is completed at a place outside the measurement range of the current position of the sensor. The grid in which the accumulation of the landmark has been completed is a target of subsequent processing. Next, the processing proceeds to step S503.

As described with reference to FIGS. 3A and 3B, a peak position scanning unit in step S503 sets a scanning line on the straight line connecting each landmark and the sensor position on the landmark accumulation information 131 acquired in step S501. The scanning line is set for each grid for which it is determined that the accumulation of the landmark obtained in step S502 has been completed. Next, the processing proceeds to step S504.

In a landmark output position calculation unit in step S504, the scanning line set in step S503 is scanned on the landmark accumulation information 131 acquired in step S501, and the peak position of the error distribution is detected as the point group coordinates. The peak detection can be realized by smoothing the voting value of the landmark accumulation information 131 on the scanning line and then using a known zero-cross method or the like. After the peak position is calculated, the peak position is stored as the landmark correction information 132 in the RAM 130. A plurality of peaks may be obtained from one scanning line. Next, the processing proceeds to step S505.

Herein, the peak position in the present specification may be a pure vertex position after certain processing such as smoothing has been performed on the voting value of the landmark accumulation information 131 on the scanning line, may be all the remaining coordinates after certain signal processing such as smoothing has been performed on the voting value of the landmark accumulation information 131 on the scanning line, or may be an average value of the remaining coordinates. In the signal processing method related to peak detection and the number of output points, it is sufficient if it leaves only points near the peak position.

A landmark distribution calculation unit in step S505 scans the scanning line set by the peak position scanning unit in step S503, and calculates the magnitude of the error distribution for each peak position obtained by the landmark output position calculation unit in step S504. The magnitude of the error distribution can be obtained by, for example, obtaining a width from the peak position where the voting value of the landmark accumulation information 131 becomes the predetermined value or more. The obtained magnitude of the error distribution for each peak position is stored as landmark correction information 132 in the RAM 130, and the flowchart of FIG. 5 ends.

(Operation of Self-Map Generation Unit 208)

Figure 6:
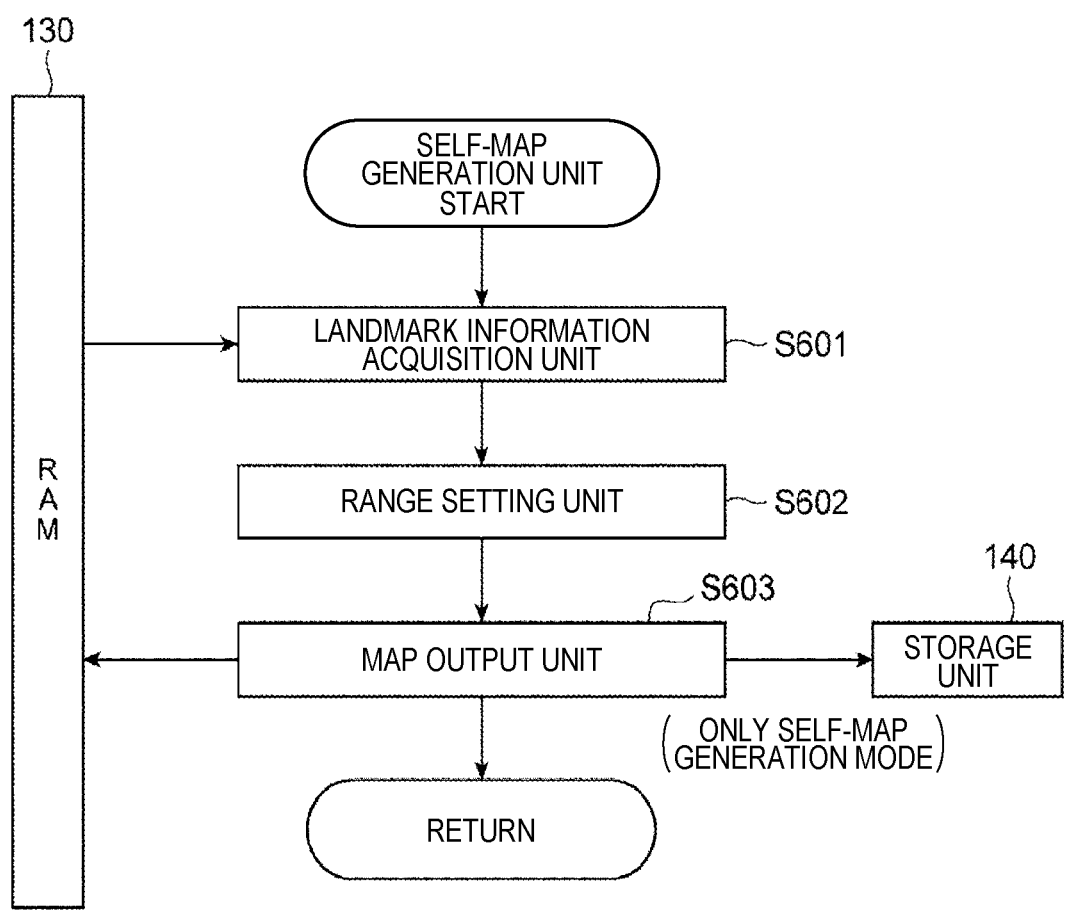
FIG. 6 is a flowchart illustrating an operation of a self-map generation unit 208.

FIG. 6 is a flowchart illustrating the operation of the self-map generation unit 208. The self-map generation unit 208 executes the following operation each time an execution command is received from the landmark position correction unit 207. An execution subject of each step described below is the computing unit 120.

A landmark information acquisition unit in step S601 acquires the landmark accumulation information 131 and the landmark correction information 132 stored in the RAM 130. Next, the processing proceeds to step S602.

In a range setting unit in step S602, the operation is switched depending on the mode of the self-map generation and self-position estimation unit 250. In the case of the self-map generation mode, the entire map generated by the landmark accumulation information 131 is a target range. In the case of the self-position estimation mode, a range which is a predetermined distance back from the current own vehicle position is the target range. Therefore, a part (partial map) generated by the landmark accumulation information 131 is the target range. As a result, there are effects of preventing a collation mistake of the self-position estimation unit 209 in the subsequent stage, shortening the collation time, and reducing the influence of the odometry error. After the target range is determined, the processing proceeds to step S603.

In a map output unit in step S603, the landmark accumulation information 131 and the landmark correction information 132 obtained by the landmark information acquisition unit in step S601 and the target range obtained by the range setting unit in step S602 are used, and on the basis of the peak position information obtained by the landmark correction information 132, the landmarks in a certain range around the peak position in the landmark accumulation information 131 are output as a landmark point group to the self-generated map (141 or 133). For example, a scanning line direction is scanned from the peak value in the landmark accumulation information 131, and a range having a value of 80% of the peak value is output as the landmark point group coordinates. This 80% is an example, and various values may be actually set. Alternatively, the range may be narrowed so that only one peak value point is output as the landmark point group coordinates.

In the case of the self-map generation mode, when a map recording end command is received, the obtained landmark point group coordinates are stored as the self-generated map 141 in the storage unit 140, and the flow of FIG. 6 ends. Furthermore, the self-map generation and self-position estimation unit 250 also ends. When the map recording end command is not received, the obtained landmark point group coordinates are stored as the self-generated map 133 in the RAM 130, and the flow of FIG. 6 ends. The processing does not proceed to the next self-position estimation unit 209, but returns to the sensor value acquisition unit 201. In the case of the self-position estimation mode, the obtained landmark point group coordinates are stored as the self-generated map 133 in the RAM 130, and the flow of FIG. 6 ends.

(Operation of Self-Position Estimation Unit 209)

Figure 7:
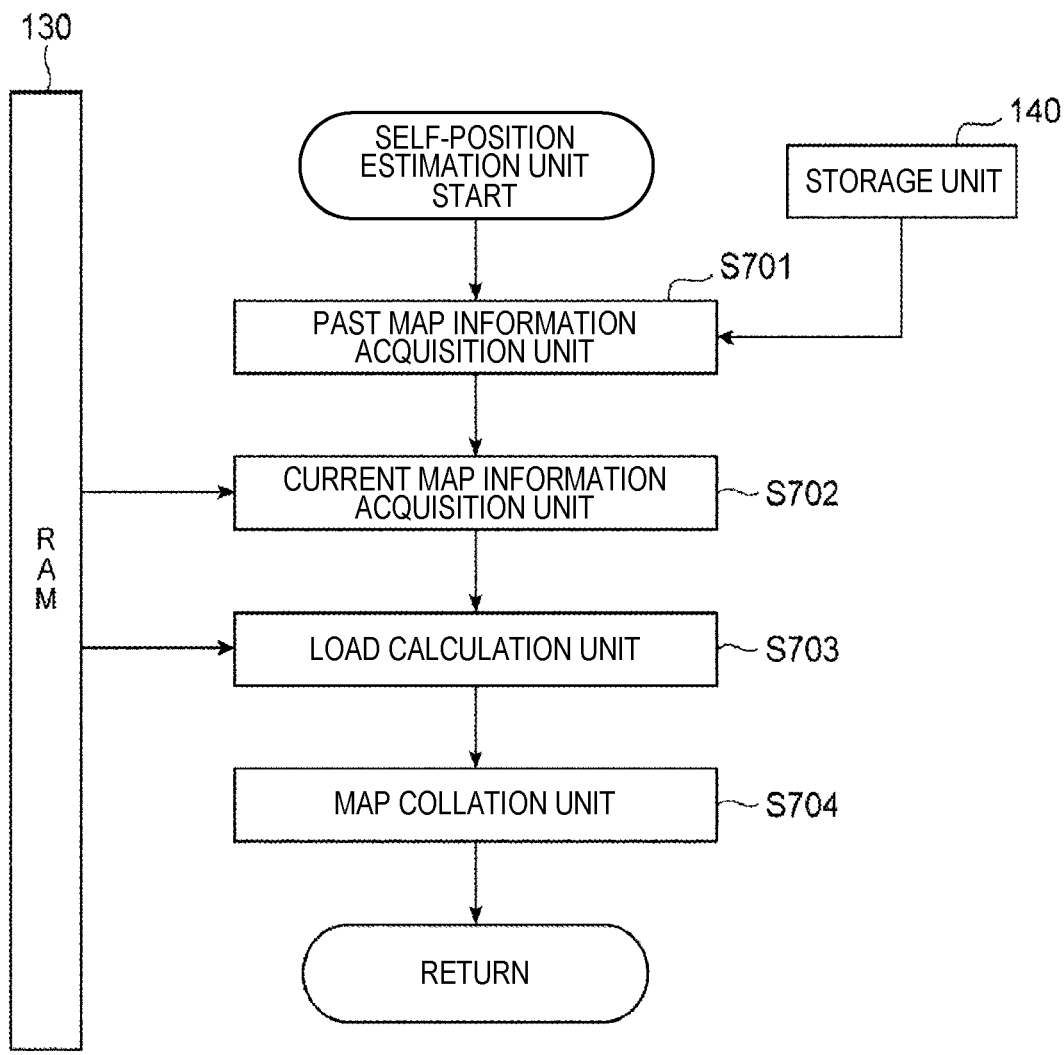
FIG. 7 is a flowchart illustrating an operation of a self-position estimation unit 209.

FIG. 7 is a flowchart illustrating the operation of the self-position estimation unit 209. The self-position estimation unit 209 executes the following operation each time an execution command is received from the self-map generation unit 208. An execution subject of each step described below is the computing unit 120. This processing is executed only in the case of the self-position estimation mode of the self-map generation and self-position estimation unit 250.

A past map information acquisition unit in step S701 acquires the self-generated map 141 stored in the storage unit 140. The self-generated map 141 is a map acquired by past traveling. After the acquisition, the processing proceeds to the next step S702.

A current map information acquisition unit in step S702 acquires the self-generated map (partial map, corrected map) 133 stored in the RAM 130 by the self-map generation unit 208 and observed during current traveling. After the acquisition, the processing proceeds to the next step S703.

A load calculation unit in step S703 acquires the landmark correction information 132 stored in the RAM 130, and acquires the magnitude information of the error distribution of each peak position included in the landmark correction information 132. Weight information (importance or reliability) of each landmark at the time of self-position estimation is calculated on the basis of the magnitude information (corresponding to the estimated error amount) of the error distribution. A setting policy is set such that when the distribution increases, the weight of the landmark decreases. The calculation formula of the weight for the magnitude of the distribution may be freely set while following the policy. Next, the processing proceeds to step S704.

A map collation unit in step S704 collates the past self-generated map 141 acquired by the past map information acquisition unit in step S701 with the landmarks of the self-generated map (partial map, corrected map) 133 observed during the current traveling acquired by the current map information acquisition unit in step S702, thereby calculating the self-position during the current traveling on the past self-generated map 141. In the case of the point group, for example, an iterative closest point (ICP) algorithm which is a known point group matching technique can be used for the collation. When the ICP algorithm is used, the self-position is calculated by reflecting the weight (importance or reliability) for each landmark obtained by the load calculation unit in step S703. In the ICP algorithm, a correspondence relationship between the points is obtained, and processing of minimizing the distance error in the correspondence relationship is repeated to collate the point groups. At this time, this weight is reflected in the distance error function of the minimizing. An error of a point having a large weight is calculated as a relatively large value, and a force for minimizing the error acts. Thus, a point having a large weight strongly acts to reduce the error as compared with other points. As a result, a reliable point with a larger weight acts to further reduce the error. By the collation between the maps, the coordinate transformation amount for transforming the self-generated map (partial map, corrected map) 133 obtained from the self-map generation unit 208 onto the self-generated map 141 can be obtained, and the self-position on the self-generated map 141 can be obtained from the position of the current vehicle obtained by performing coordinate-transformation on the basis of the coordinate transformation amount. The self-position on the self-generated map 141 is output, and the flow of FIG. 7 ends. After the end, the processing returns to the sensor value acquisition unit 201.

Operational Effect

According to the first embodiment described above, the following operational effects can be obtained.

That is, the self-map generation and self-position estimation device 100 according to the first embodiment described above generates a point group map from point group data of external information obtained by a vehicle-mounted sensor mounted on a vehicle. The self-map generation and self-position estimation device includes: the landmark detection unit 203 that detects a landmark from the point group map; the landmark information accumulation unit 206 that accumulates observation position information of the detected landmark; the landmark position correction unit 207 that corrects a position of the landmark on the basis of point group coordinates extracted from an error distribution detected when observation position information of the landmark has been frequency-distributed (specifically, on the basis of a peak position, the peak position being extracted as the point group coordinates in the error distribution detected when the observation position information of the landmark has been frequency-distributed); and the self-map generation unit 208 that saves, as a self-generated map, a corrected map obtained by correcting the position of the landmark and obtained from the landmark position correction unit 207 (in the storage unit 140 or the RAM 130).

The vehicle-mounted sensor is a distance sensor (for example, a stereo camera) including a plurality of cameras, and the error distribution occurs in a line-of-sight direction (ray direction) due to a parallax error of the distance sensor. Then, the landmark position correction unit 207 performs scanning in the line-of-sight direction (ray direction) of the distance sensor and extracts a peak position of the error distribution as the point group coordinates.

The self-map generation and self-position estimation device 100 includes the self-position estimation unit 209 that performs self-position estimation during current traveling of the vehicle by collating the saved self-generated map with the corrected map newly obtained from the landmark position correction unit 207 during the current traveling of the vehicle.

The self-position estimation unit 209 calculates an importance (reliability) of the landmark by using an estimated error amount (magnitude information of the error distribution for each peak position) obtained from at least one of the corrected map obtained from the landmark position correction unit 207 or the self-generated map (S703: load calculation unit), and performs self-position estimation by reflecting the obtained importance (reliability).

Therefore, by estimating the error amount of the landmark serving as the observation point and improving the quality of the self-generated point group map, it is possible to perform high-accuracy self-position estimation even in a case where the observation error by the sensor is large.

Second Embodiment

Figure 8:
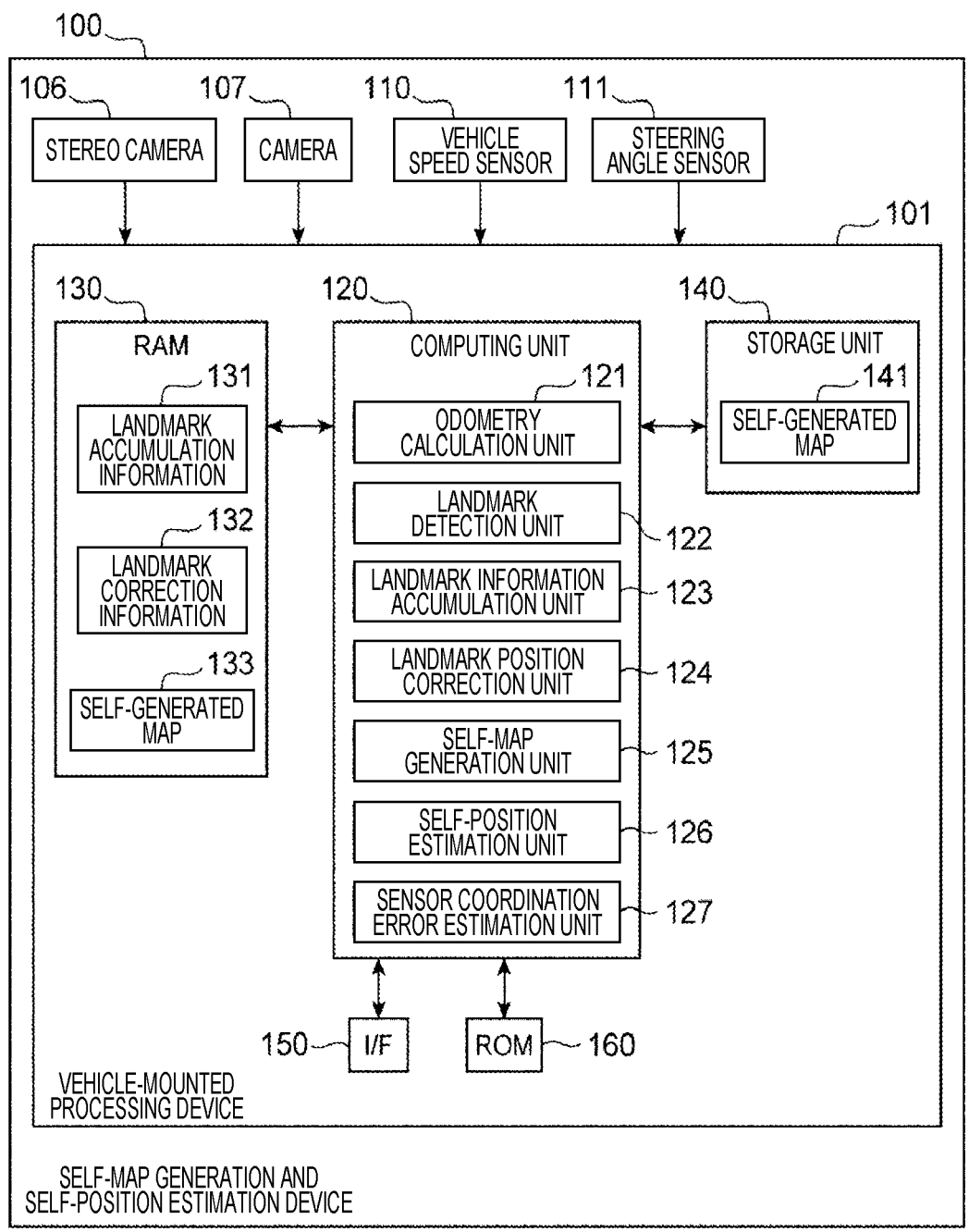
FIG. 8 is a block diagram illustrating a configuration of the self-map generation and self-position estimation device 100 when a plurality of external sensors are mounted according to a second embodiment of the present invention.

FIG. 8 is a block diagram illustrating a configuration of the self-map generation and self-position estimation device 100 according to a second embodiment of the present invention. The self-map generation and self-position estimation device 100 includes a sensor group (106, 107, 110, 111) and the vehicle-mounted processing device 101. The sensor group which is a vehicle-mounted sensor is connected to the vehicle-mounted processing device 101 by a signal line, and transmits and receives various kinds of data to and from the vehicle-mounted processing device 101.

The vehicle-mounted processing device 101 includes a computing unit 120, a RAM 130, a storage unit 140, an interface 150, and a ROM 160. The computing unit 120 is different from that of the first embodiment in FIG. 1 in including a sensor coordination error estimation unit 127. In addition, the second embodiment is different from the first embodiment in FIG. 1 in that the stereo camera 106 and the monocular camera (hereinafter, may be simply referred to as a camera) 107, which are two different types of external sensors for observing the surroundings (external information) of the vehicle, are simultaneously provided as the sensor group. In the present embodiment, the stereo camera 106 and the monocular camera 107 are used, but a combination of other two different types of sensors may be used.
(Functional Block Configuration)

Figure 9:
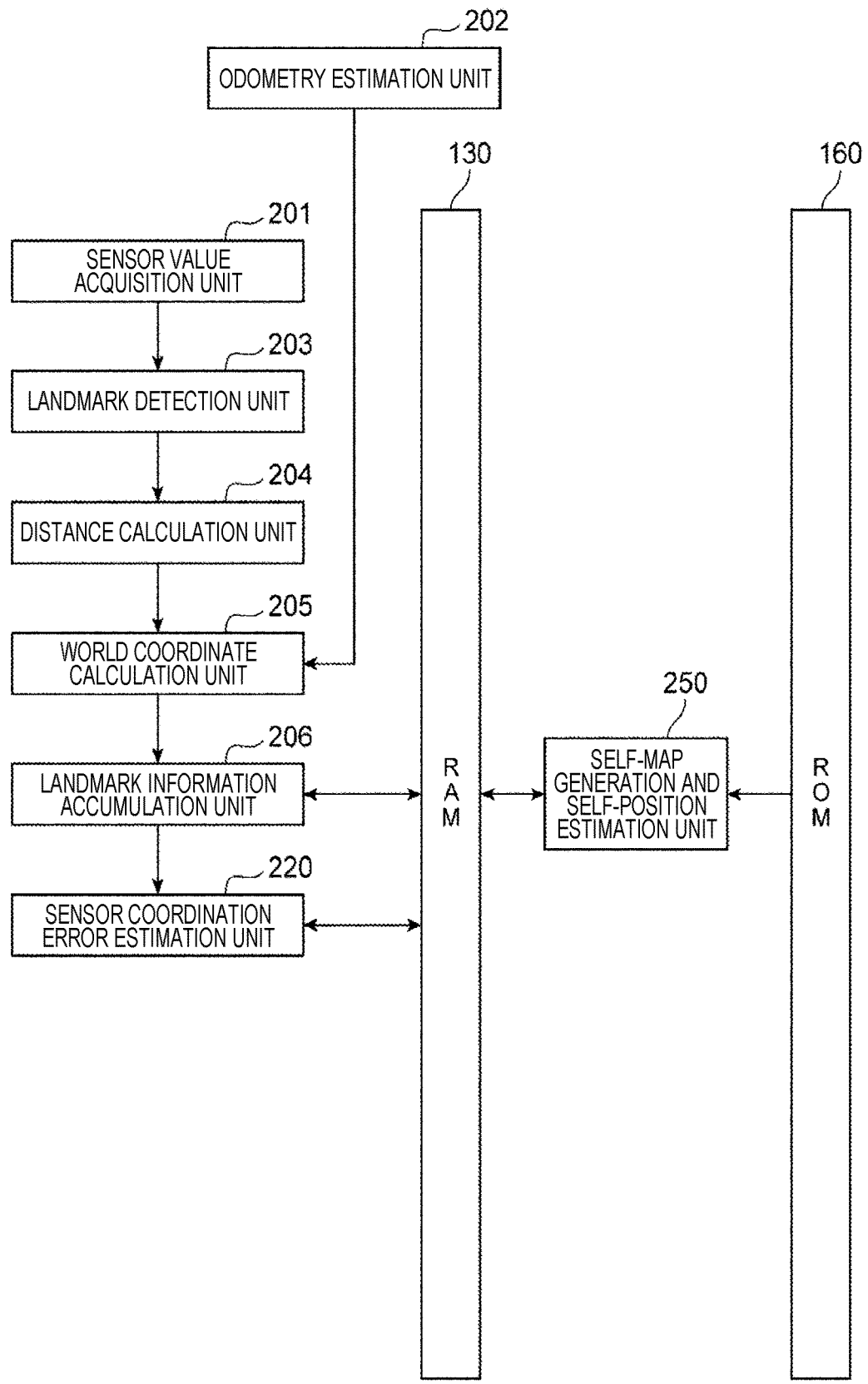
FIG. 9 is a functional block diagram illustrating the operation of the self-map generation and self-position estimation device 100 when the plurality of external sensors are mounted according to the second embodiment of the present invention.

FIG. 9 is a functional block diagram illustrating the operation of the self-map generation and self-position estimation device 100 when a plurality of external sensors is mounted. The functions of the odometry calculation unit 121, the landmark detection unit 122, the landmark information accumulation unit 123, the sensor coordination error estimation unit 127, and the self-map generation and self-position estimation unit 250 executed by the computing unit 120 are illustrated as functional blocks, and the processing order of the functional blocks, a data flow between the functional blocks, and a data flow between the functional blocks and the RAM 130, the ROM 160, and the storage unit 140 are illustrated. Since the odometry calculation unit 121, the landmark detection unit 122, the landmark information accumulation unit 123, and the self-map generation and self-position estimation unit 250 are the same as those illustrated in the first embodiment of FIG. 1, the description thereof will be omitted. However, the external sensor of the self-map generation and self-position estimation unit 250 is the stereo camera 106. It is assumed that the sensor value acquisition unit 201 in FIG. 9 acquires the information of the camera 107.

(Sensor Coordination Error Estimation Unit 220)

The sensor coordination error estimation unit 220 estimates an error amount (landmark detection error amount) of the landmark accumulation information 131 obtained from the camera 107 by using the landmark accumulation information 131 by the camera 107 obtained from the landmark information accumulation unit 206 and the landmark correction information 132 (corresponding to the corrected map created on the basis of the stereo camera 106) by the stereo camera 106 obtained from the self-map generation and self-position estimation unit 250. For example, in the case of the motion stereo method of the monocular camera 107, in practice, landmark information cannot be densely obtained, voting on the landmark accumulation information 131 cannot be gathered, and it may be difficult to obtain an accurate peak position and an accurate magnitude of error distribution. On the other hand, the stereo camera 106 can densely acquire the landmark information and has high accuracy, the landmark correction information 132 obtained from the stereo camera 106 which is a sensor with high accuracy as described above is utilized to estimate the error amount of the landmark accumulation information 131 obtained from the camera 107 which is a sensor with low accuracy. If the error amount of the landmark accumulation information 131 can be estimated, the importance (reliability) of the landmark can be calculated, and as described above, the importance or the reliability can be reflected as the weight (importance or reliability) for each landmark at the time of self-position estimation, so that a self-position estimation accuracy is improved. However, this processing is based on the premise that sensors can observe a common object. For the common observation object, the landmark correction position obtained from the landmark correction information 132 estimated by the sensor with higher accuracy is regarded as a true value, and the deviation of the distance, from the true value, of the observation position of the observation value of the common observation object acquired by the sensor with lower accuracy is set as an error amount in the sensor with lower accuracy.

(Operation of Sensor Coordination Error Estimation Unit 220)

Figure 10:
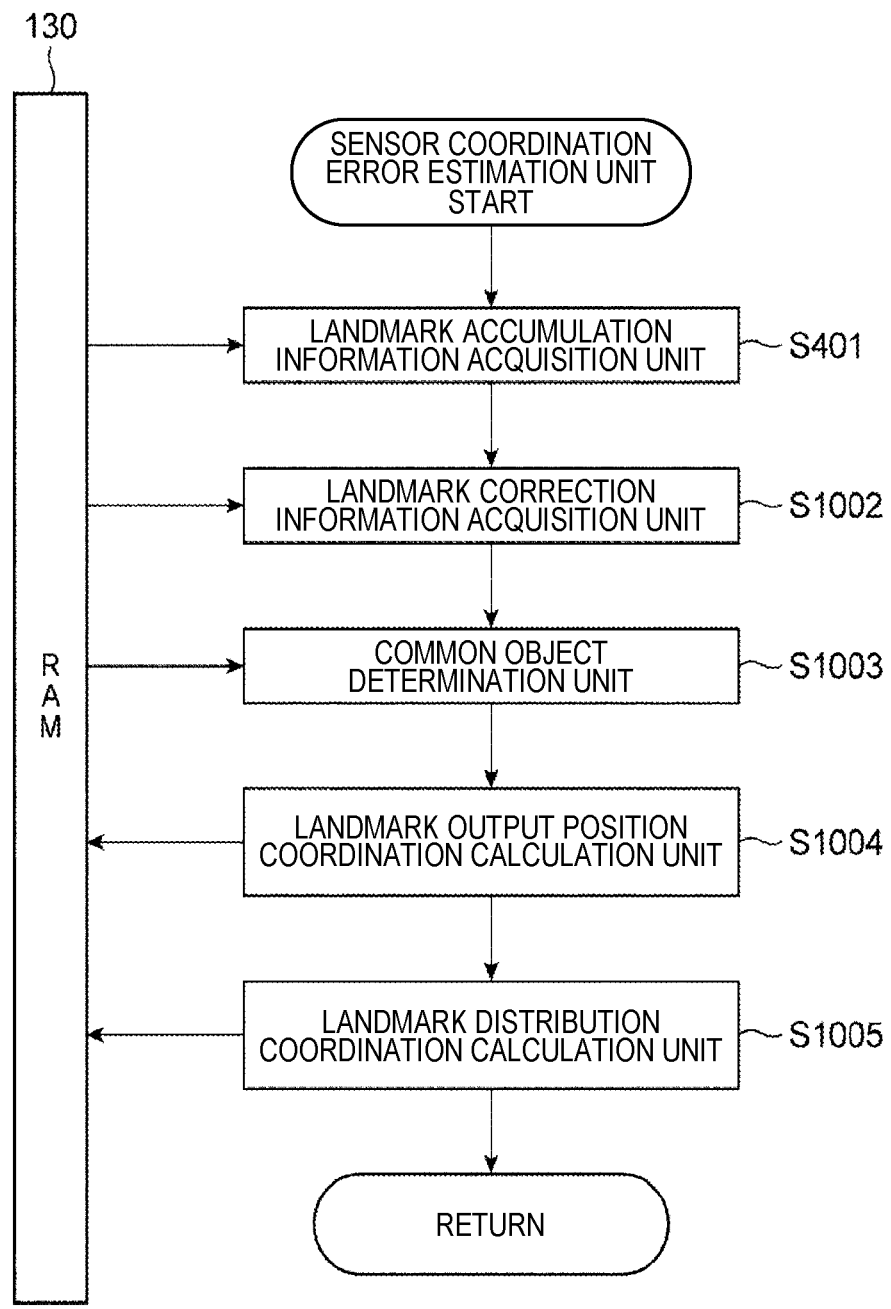
FIG. 10 is a flowchart illustrating an operation of a sensor coordination error estimation unit 220.

FIG. 10 is a flowchart illustrating the operation of the sensor coordination error estimation unit 220. The sensor coordination error estimation unit 220 executes the following operation each time an execution command is received from the landmark information accumulation unit 206. An execution subject of each step described below is the computing unit 120.

In the same manner as in FIG. 4, the landmark accumulation information acquisition unit in step S401 acquires the landmark accumulation information 131 stored in the RAM 130 and acquired from the camera 107. Next, the processing proceeds to step S1002.

A landmark correction information acquisition unit in step S1002 acquires the landmark correction information 132 (corrected map) stored in the RAM 130 and acquired from the stereo camera 106. Next, the processing proceeds to step S1003.

A common object determination unit in step S1003 determines an object commonly observed by the stereo camera 106 and the camera 107. It is assumed that the sensors have a common visual field. The determination is made by a predetermined known image recognition method. When the determination of all the common objects in the observation range is completed, the processing proceeds to step S1004.

A landmark output position coordination calculation unit in step S1004 uses the landmark accumulation information 131 obtained from the camera 107, the landmark correction information 132 (corrected map) obtained from the stereo camera 106, and the common object determination result obtained by the common object determination unit in step S1003 to correct the landmark position of the camera 107 which is a sensor with lower accuracy. In the landmark correction information 132 obtained by the stereo camera 106 which is a sensor with higher accuracy, the peak position of the landmark determined to be the common object is set as true object detection coordinates. The peak position of the landmark accumulation information 131 obtained from the camera 107 is ignored. Next, the processing proceeds to step S1005.

A landmark distribution coordination calculation unit in step S1005 uses the landmark correction information 132 obtained in step S1004 and the landmark accumulation information 131 obtained from the camera 107 to estimate the error distribution of the landmark. In the landmark accumulation information 131, for a grid in which the voting value within a predetermined distance from each landmark correction position is a predetermined value or more, an error from the landmark correction position is measured, and frequency distribution is performed. The width of the frequency distribution is set as the estimation error distribution (corresponding to the landmark detection error amount) of the landmark.

Operational Effect

According to the second embodiment, the following operational effects can be obtained.

That is, the self-map generation and self-position estimation device 100 according to the second embodiment described above further includes the sensor coordination error estimation unit 220 that estimates a detection error amount of (observation position information of) the landmark detected by another sensor (for example, the monocular camera 107) different from the vehicle-mounted sensor (for example, the stereo camera 106) by using the corrected map created on a basis of the vehicle-mounted sensor.

Therefore, in a case where a plurality of external sensors are provided to have a common observation range, a sensor with higher accuracy is used so that the landmark position of a sensor with lower accuracy can be corrected, and the error distribution (detection error amount) of the landmark can be estimated. Therefore, the accuracy of the self-generated map can be improved, and the accuracy of the self-position estimation can be improved by using the error distribution (detection error amount).

Third Embodiment

Figure 11:
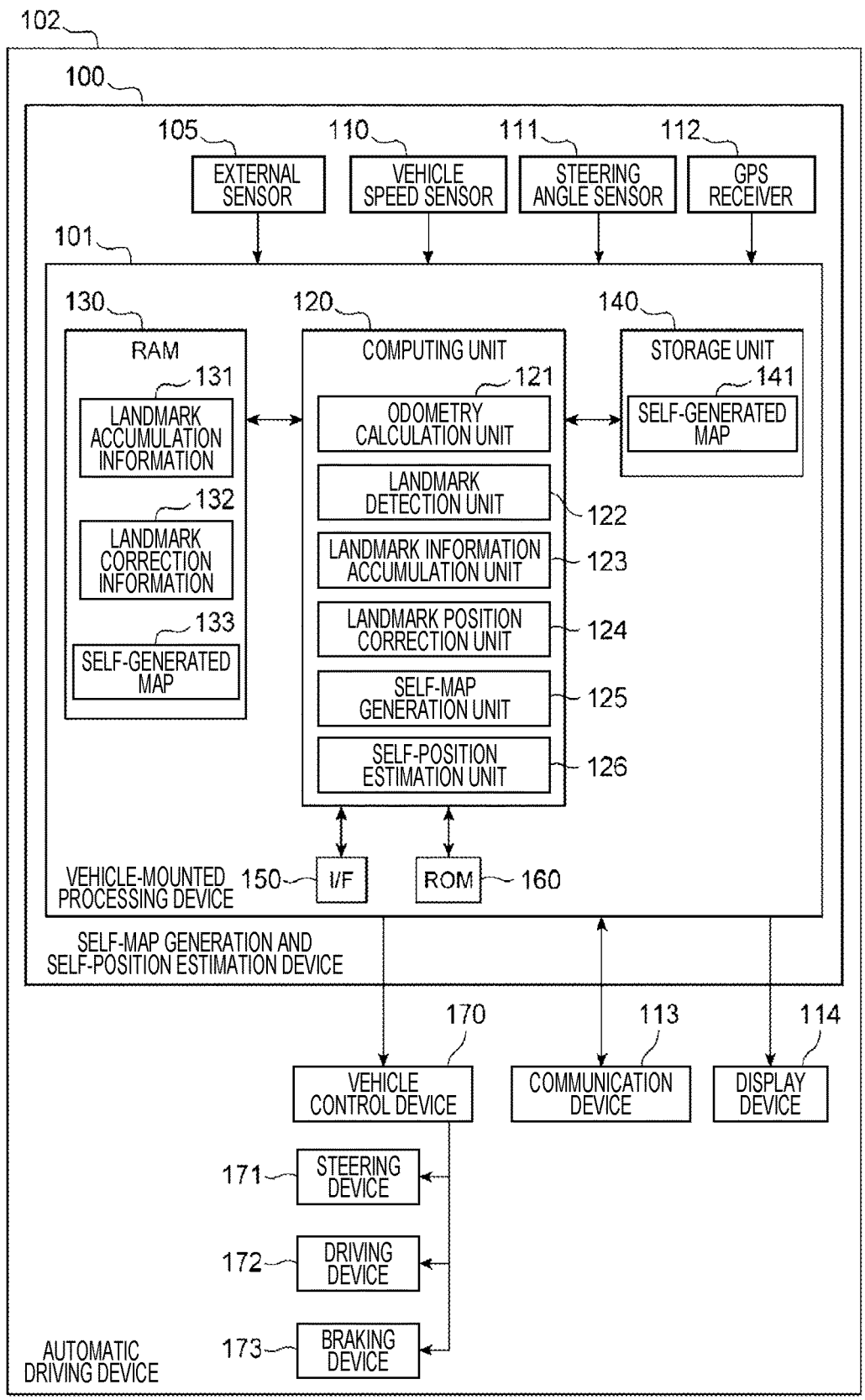
FIG. 11 is a block diagram illustrating a configuration of an automatic driving device 102 including the self-map generation and self-position estimation device 100 according to a third embodiment of the present invention.

FIG. 11 is a block diagram illustrating a configuration of an automatic driving device 102 including the self-map generation and self-position estimation device 100 according to a third embodiment of the present invention. The automatic driving device 102 includes a modified configuration of the self-map generation and self-position estimation device 100, a communication device 113, a display device 114, and a vehicle control device group (170 to 173) that controls the vehicle.

The self-map generation and self-position estimation device 100 includes a sensor group (105, 110, 111, 112) and a vehicle-mounted processing device 101. The sensor group, which are vehicle-mounted sensors, the vehicle control device group, the communication device 113, and the display device 114, are connected to the vehicle-mounted processing device 101 via signal lines, and exchange various kinds of data with the vehicle-mounted processing device 101. The self-map generation and self-position estimation device 100 is different from that of the first embodiment in FIG. 1 only in including a GPS receiver 112.

The GPS receiver 112 receives signals from a plurality of satellites configuring a satellite navigation system, and calculates the position of the GPS receiver 112, that is, a latitude and a longitude by calculation based on the received signals. Note that the accuracy of the latitude and longitude calculated by the GPS receiver 112 does not have to be high accuracy, and for example, an error of about several meters to 10 meters may be included. The GPS receiver 112 outputs the calculated latitude and longitude to the vehicle-mounted processing device 101.

The communication device 113 is used for wirelessly exchanging information between a device outside the vehicle and the vehicle-mounted processing device 101. For example, when the user is outside the vehicle, the communication device exchanges information by communicating with a mobile terminal worn by the user. The target with which the communication device 113 communicates is not limited to the mobile terminal of the user.

The display device 114 is, for example, a liquid crystal display, and displays the information output from the vehicle-mounted processing device 101.

The vehicle control device 170 controls a steering device 171, a driving device 172, and a braking device 173 on the basis of the information output from the vehicle-mounted processing device 101, for example, the current (traveling) self-position on the self-generated map 141 output from the self-position estimation unit 126. The steering device 171 operates the steering of the vehicle. The driving device 172 applies a driving force to the vehicle. For example, the driving device 172 increases the driving force of the vehicle by increasing the target rotation speed of the engine included in the vehicle. The braking device 173 applies a braking force to the vehicle.

In the automatic driving device 102, the self-generated map 141 stored in the storage unit 140 may be stored (saved) in a server or the like via the communication device 113, and may be utilized by other vehicles. In addition, the self-generated map 141 stored in the server via the communication device 113 by the automatic driving device 102 mounted on another vehicle may be acquired via the communication device 113, stored in the storage unit 140, and utilized as the self-generated map of the vehicle for self-position estimation.

In the automatic driving device 102, the reception position (estimated absolute coordinate) of the GPS receiver 112 at each time is attached to the self-generated map, and when the self-position estimation is performed, it is searched for whether there is a map having a value close to the current GPS value, and a map to be collated is selected. Even in a case where the GPS cannot perform reception, the absolute position (absolute coordinate) is estimated by referring to the GPS in the odometry calculation unit 121, and the absolute position (absolute coordinate) estimated from the most recently observed GPS value is obtained.

(The vehicle control device 170 of) the automatic driving device 102 estimates the self-generated map 141 generated by the self-map generation and self-position estimation device 100 and the self-position on the self-generated map 141 by the self-position estimation unit 126 included in the self-map generation and self-position estimation device 100, and automatically drives the vehicle according to the estimated self-position.

Operational Effect

According to the third embodiment, the following operational effects can be obtained.

That is, the self-map generation and self-position estimation device 100 according to the third embodiment described above includes the vehicle control device 170 (automatic driving device 102) that automatically drives the vehicle in accordance with the self-generated map generated by the self-map generation and self-position estimation device 100 and a self-position obtained when the self-position on the self-generated map is estimated by the self-position estimation unit 126 (209) included in the self-map generation and self-position estimation device 100.

In order to enable another vehicle to utilize the self-generated map 141, The self-map generation and self-position estimation device 100 is capable of saving the self-generated map 141 in a server via the communication device 113 or acquiring the self-generated map 141 generated by another vehicle via the communication device 113 and utilizing the self-generated map as the self-generated map 141 of the vehicle.

The self-map generation and self-position estimation device 100 assigns absolute coordinates estimated from a GPS and odometry to the self-generated map.

According to the third embodiment, it is possible to automatically drive the vehicle with high accuracy on the basis of the self-position estimated with high accuracy. In addition, by sharing the self-generated map with another vehicle via the server, high-accuracy self-position estimation can be performed even in a case where there is little information (traveling experience).

Note that the present invention is not limited to the above-described embodiment, and various modifications are included. For example, the above-described embodiment has been described in detail for easy understanding of the invention and is not necessarily limited to those having all the described configurations. Other embodiments considered within the scope of the technical idea of the present invention are also included within the scope of the present invention. In addition, a part of the configuration of a certain embodiment can be replaced with the configuration of another embodiment, and the configuration of another embodiment can be added to the configuration of a certain embodiment. Further, it is possible to add, delete, and replace other configurations for a part of the configuration of each embodiment. In addition, the self-map generation and self-position estimation device 100 may include an input/output interface (not illustrated), and if needed, a program may be read from another device via the input/output interface and a medium that can be used by the self-map generation and self-position estimation device 100. Herein, the medium refers to, for example, a storage medium removable from the input/output interface or a communication medium, that is, a wired, wireless, light or other network or a carrier wave or digital signal propagating through the network. In addition, some or all of the functions implemented by the program may be implemented by a hardware circuit or an FPGA. In addition, each of the above-described configurations, functions, and the like may be realized by software by a processor interpreting and executing a program for realizing each function. Information such as a program, a table, and a file for realizing each function can be stored in a memory, a recording device such as a hard disk and a solid state drive (SSD), or a recording medium such as an IC card, an SD card, or a DVD.

REFERENCE SIGNS LIST 100 self-map generation and self-position estimation device
101 vehicle-mounted processing device
102 automatic driving device
105 external sensor
106 stereo camera
107 camera
110 vehicle speed sensor
111 steering angle sensor
112 GPS receiver
113 communication device
114 display device
120 computing unit
121 odometry calculation unit
122 landmark detection unit
123 landmark information accumulation unit
124 landmark position correction unit
125 self-map generation unit
126 self-position estimation unit
127 sensor coordination error estimation unit
130 RAM
131 landmark accumulation information
132 landmark correction information
133 self-generated map
140 storage unit
141 self-generated map
150 interface
160 ROM
170 vehicle control device
171 steering device
172 driving device
173 braking device
201 sensor value acquisition unit
202 odometry estimation unit
203 landmark detection unit
204 distance calculation unit
205 world coordinate calculation unit
206 landmark information accumulation unit
207 landmark position correction unit
208 self-map generation unit
209 self-position estimation unit
220 sensor coordination error estimation unit
250 self-map generation and self-position estimation unit

The invention claimed is:

1. A self-position estimation device that generates a point group map from point group data of external information obtained by a vehicle-mounted sensor mounted on a vehicle and estimates a self-position on the point group map, wherein the vehicle-mounted sensor is a distance sensor configuring a plurality of cameras, the self-position estimation device being configured to:
   detect a landmark from the point group map;
   accumulate observation position information of the detected landmark;
   scan, in a line-of-sight direction of the distance sensor and extract, as point group coordinates, a peak position of an error distribution;
   correct a position of the landmark on a basis of the point group coordinates extracted from the error distribution that occurs in the line-of-sight direction due to a parallax error of the distance sensor and is detected when the observation position information of the landmark has been frequency-distributed;
   calculate an importance of the landmark based on a spread of the error distribution;
   save, as a self-generated map, a corrected map obtained by correcting the position of the landmark; and
   estimate a current position of the vehicle during its travel by comparing a past self-generated map associated with travelling with the corrected map associated with current traveling, weighted by the importance.

2. The self-position estimation device according to claim 1, further configured to:
   correct the position of the landmark on a basis of the peak position; and
   calculate the importance of the landmark based on a magnitude of the spread of the error distribution at each peak position.

3. The self-position estimation device according to claim 1, further configured to:
   estimate a detection error amount of the landmark detected by another sensor different from the vehicle-mounted sensor by using the corrected map created on a basis of the vehicle-mounted sensor.

4. The self-position estimation device according to claim 1, wherein in order to enable another vehicle to utilize the self-generated map, the self-position estimation device is capable of saving the self-generated map in a server via a communication device or acquiring the self-generated map generated by another vehicle via the communication device and utilizing the self-generated map as the self-generated map of the vehicle.

5. The self-position estimation device according to claim 1, wherein the self-position estimation device assigns absolute coordinates estimated from a GPS and odometry to the self-generated map.

6. The self-position estimation device according to claim 1, further comprising a vehicle control device that automatically drives the vehicle in accordance with the self-generated map generated by the self-position estimation device and a self-position obtained when the self-position on the self-generated map is estimated by the self-position estimation device.

\* \* \* \* \*